Patented Aug. 16, 1927.

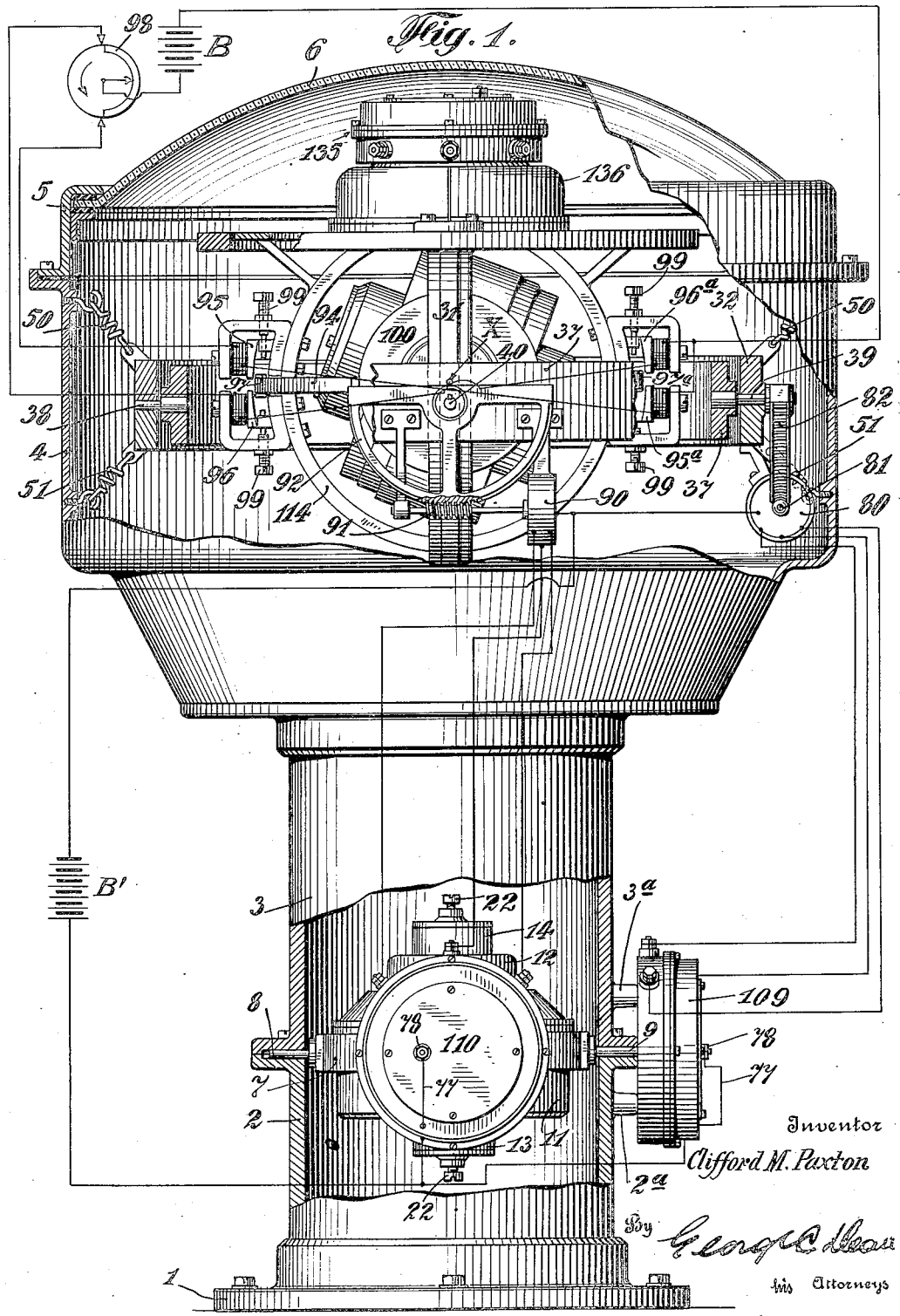

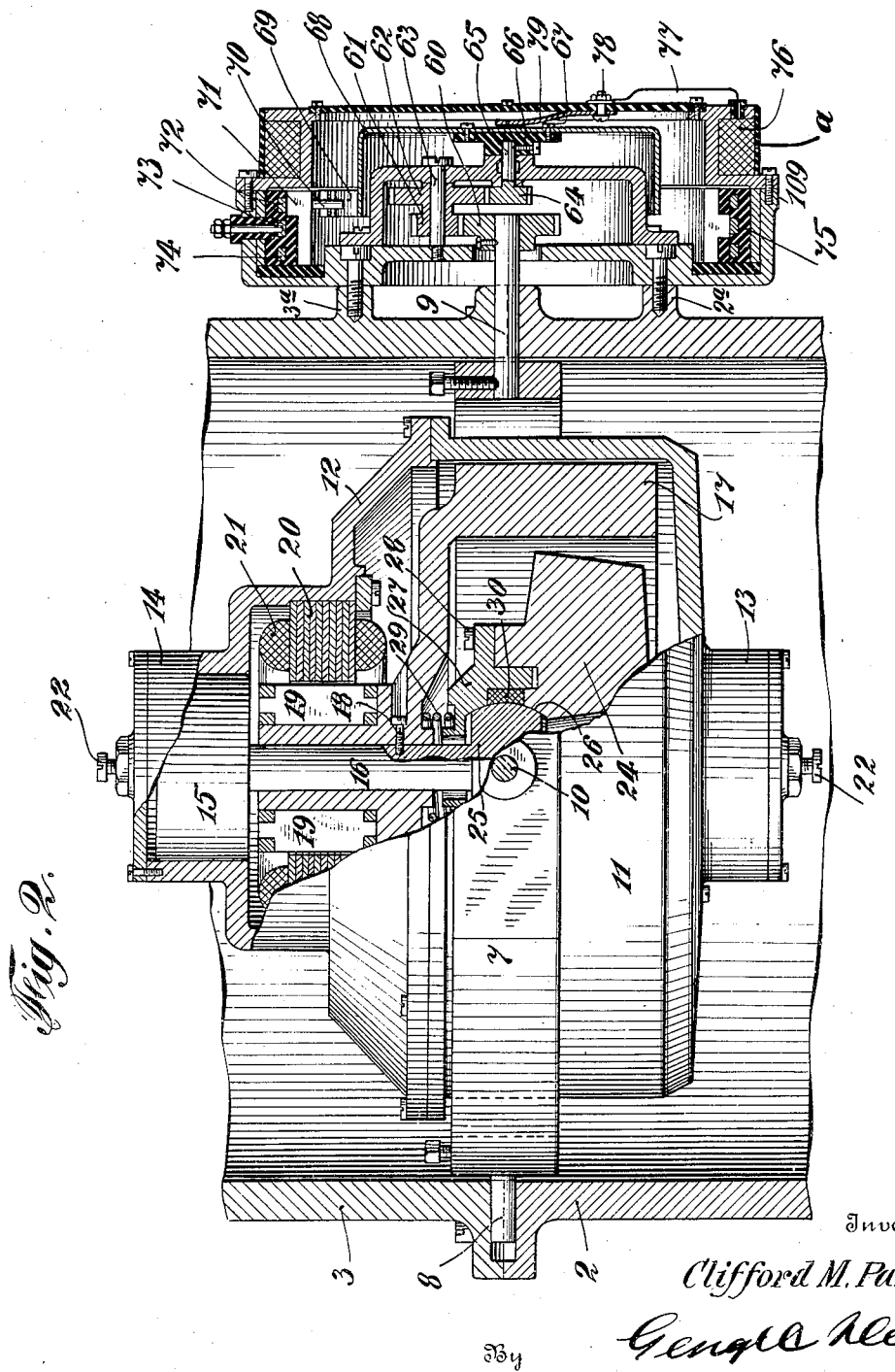

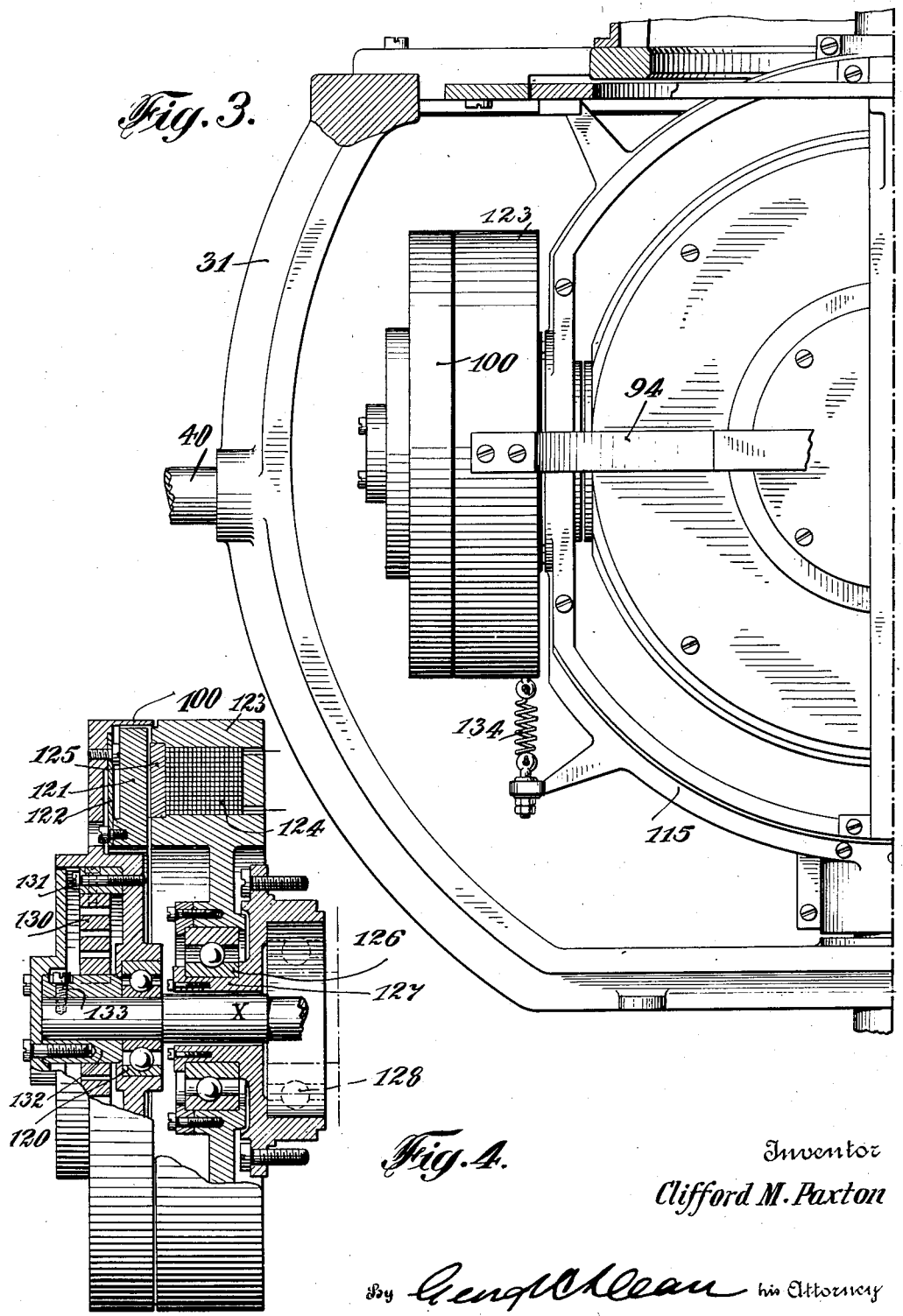

1,639,233

UNITED STATES PATENT OFFICE.

CLIFFORD M. PAXTON, OF BROOKLYN, NEW YORK.

GYROSCOPIC APPARATUS.

Application filed October 15, 1921. Serial No. 507,969.

My present invention is shown as embodied in a gyro compass adapted for use on shipboard. It includes a non-ballistic compass in combination with a stabilized base therefor.

For my present purpose I prefer that the non-ballistic compass be of the type set forth in my Patent No. 1,380,336. In said patent the orienting of said compass to north depends on the application of alternating torques about the horizontal, pivotal axis of the mounting of the gyro. Applying such torques gives a resultant reaction on the frame tending to angularly displace it with reference to earth's horizontals and verticals. Hence the patent explains that the frame of the compass should have a mounting adapted to afford a stable support maintaining, within limits, certain predetermined relations with respect to earth's horizontals and verticals; also that any desired form of stabilized base may be used for this purpose.

In my present apparatus, I employ a gyro stabilizer, preferably operating, not by the dynamic power of the gyroscope, but rather by the power of suitable motors controlled and directed by a gyroscopic inclinometer. A gyro-inclinometer desirable for this purpose is described in my application Ser. No. 427,467, filed Dec. 1, 1920. While the device illustrated in said application includes only the essentials necessary for an inclinometer, the description tells how the construction may be modified and may be combined with motor circuits so that the horizontal, or any other plane maintained by the inclinometer, will be repeated to control a similar horizontal or angular position of a distant base which may be the frame of my said gyro-compass. This, of course, requires maintaining angular position with respect to the two horizontal axes at right angles to each other, and this requires that the pivotal axes of the inclinometer be mounted parallel with the corresponding pivotal axes of the base to be controlled thereby.

A commutator and circuit adapted to repeat and reproduce such angular variations so that the approximate horizontals and verticals maintained by the inclinometer will be maintained for the stabilized base, is described in my prior applications Ser. No. 351,236, filed Jan. 13, 1920, and Ser. No. 356,045, filed Feb. 3, 1920. In the latter application the pivotal motions to be reproduced at a distance are those of certain of the axes of gyroscopes variously employed, but it is obvious that the same mechanism will serve for the pivotal axes of the inclinometer mounting.

While the broad combination constituting my present invention might be made up directly from units such as shown in the above applications and patent, the actual physical construction of the units shown herein are somewhat modified in various details which will be shown hereinafter.

The above and other features of my invention may be more fully understood in connection with the description of the accompanying drawings, in which—

Fig. 1 is an elevation of the binnacle having the upper part broken away to show the compass and having the lower part broken away to show the inclinometer; also the circuits whereby the motions, or apparent motion, of the inclinometer are repeated to and reproduced in the frame of the compass.

Fig. 2 is an enlarged section of the inclinometer as shown in Fig. 1, but with parts of the casing broken away to vertical section to show the construction of the inclinometer and one of the repeating commutators operated thereby.

Fig. 3 is an elevation, partly broken away, of a part of the sensitive element and main mounting frame of the gyro-compass as shown in Fig. 1, viewed at right angles to Fig. 1.

Fig. 4 is a sectional elevational view of the magnetic clutch embodied in the compass.

In these drawings the binnacle casing comprises a base 1, standard 2, 3, and compass case 4, the latter being closed in by a cover consisting of flanged ring section 5, and transparent top 6.

The inclinometer is mounted in gimbals, the outer ring 7 being supported by pivots 8, 9. In this ring 7, the gyro casing 11 is supported by pivots 10, at right angles to the pivotal axis 8, 9. The inclinometer casing comprises the lower section 11 and upper section 12, formed respectively with bosses 13, 14, containing the roller bearings, one of said bearings being shown at 15. These upper and lower bearings may be of any desired type but are preferably of the type shown in my application Serial No. 423,641, filed Nov. 12, 1920. These bearings support the shaft 16 on which the gyro rotor 17 is secured as by screw 18; on the same shaft and preferably integral with said rotor is the armature, or so-called squirrel cage, 19, of an induction motor, the iron field of which is indicated at 20, and energized by coils indicated at 21. This motor may be of any known or desired construction.

The entire inclinometer, including casing, shaft, 16, rotor 17, and armature 19, is designed and adjusted to have its center of gravity exactly in the intersection of the pivotal axis 10, 10, with the pivotal axis 8, 9. In order to bring this about, the parts will, of course, be designed for approximate balance, the gyro rotor will then be adjusted for running balance, and the static balance of the whole may be finally adjusted by screwing up or backing off thrust screws 22, 22, respectively, thereby correlatively adjusting the bearings 15 and shaft 16 carried thereby.

The above parts of the structure being thus universally-balanced, non-pendulous and therefore non-ballistic, the pendulous element of the arrangement whereby the above described structure may be made to seek earth's vertical is afforded by a secondary gyro rotor 24 mounted upon and carried by shaft 16 through the medium of any desired form of universal joint. This may be a gimbal joint as shown in my inclinometer application referred to above, or, as described in said application and as shown herein, it may be a ball and socket joint comprising a bearing element 25 on shaft 16, having the shape of a zone of a sphere. The socket element may be formed partly in the rotor element as at 26, and partly in a cooperating annular collar 27, secured to the rotor by screws 28.

The inclinometer motor being energized through the usual circuits, not shown, will drive the primary gyro element 17 at high speed. The latter element and the casing therefor, being balanced, in neutral equilibrium as described, will tend to maintain any angular position in which it is placed, and being primarily placed with its axis vertical and plane of rotation horizontal, it will tend to maintain such position. As explained in my prior application, two gyros mounted upon and driven through the same shaft, one rigidly and the other through the medium of a universal joint, tend to set their axes in alignment. In this case, the secondary gyro being pendulous will tend to keep vertical the axis of the neutral gyro. Normal operation having been established as above, rolling and pitching of the ship will cause some ballistic torque to be applied to the pendulous secondary gyro, but will not affect the neutral primary gyro, except through friction in the pivotal mounting. The neutral gyro, while capable of ultimately aligning itself with an abnormal, long continued displaced position of the pendulous gyro will nevertheless tend to maintain its original vertical direction for a relatively long time after the secondary gyro has been displaced, and in practice the self-aligning tendency of the neutral gyro may be such that it will substantially maintain the original correct vertical of the earth until the pendulous gyro is again restored to vertical, even though the displacement of the pendulous gyro continues for a considerable time.

The above and other features of desirable design and operation of the inclinometer element are fully disclosed in said application, Serial No. 427,467.

In addition to, or as a substitute for, the friction of the ball and socket joint as a means for making the two gyros tend to self-alignment, I have shown a spring 29, as means affording an aligning spring pressure, and also as means for increasing the friction in the universal joint, either or both. It will be understood that such spring is not necessary since a desired predetermined self-aligning tendency can be secured by proper design of the universal joint and by adjusting the clamping pressure of collar 27 or of the packing 30, which is clamped by said collar.

The stabilized base, that is, the frame member of the compass, the horizontals and verticals of which are to be approximately maintained by the inclinometer, is, in the present case, represented by the vertical ring 31 and the support therefor is the ring 32. Functionally considered this ring 32 follows all of the motions of the ship or other craft on which the compass is located, but its connection to the ship through binnacle casing 4 instead of being absolutely rigid is through shock absorbers in the form of support springs 50, 50, and tension springs 51, 51. These shock absorbers may be of suitable construction but employed herein they consist of a multiplicity of stiff, spiral springs distributed all around the periphery of ring 32. They are made stiff enough to prevent any substantial bodily movement of ring 32 with respect to casing 4 but the resiliency of the construction is such that vibrations of the ship's machinery will be mostly damped out so as to be of small effect on the compass support ring 32.

This ring 32 forms a support for pivots 38, 39, which correspond to pivots 8, 9, of the inclinometer and the support ring 37, corresponding to ring 7 of the inclinometer. Ring 37 supports the pivots 40 at right angles to, and in the same plane with, pivots 38, 39. Pivots 40 are parallel with and correspond to pivots 10 of the inclinometer.

Pivots 40 are rigid with the ring 31, which corresponds to the casing of the inclinometer.

The pivotal movements of the inclinometer mounting are transmitted to and reproduced in the corresponding pivots of the compass support through circuits controlled by commutator mechanisms 109, 110, Fig. 1, which are mechanically actuated by the inclinometer pivots 9, 10. Commutator mechanisms are preferably of the construction shown in Fig. 2. The pivot 9 carries a gear 60 driving pinion 61 which is rigid with gear 62 rotatably mounted on countershaft 63. Gear 62 meshes with pinion 64 on shaft 65 carrying an insulating block 66, secured thereto by screw 67. Block 66 carries a rotor 68 to which is rigidly secured a spring 69 carrying a brush 70. It will be understood that this spring and brush construction need not be rigidly adhered to but is intended to illustrate resilient means of supporting the contacting means. The word brush is also understood to cover trolleys or other well known means of making contact. It is also understood and contemplated that a multiplicity of brushes may be arranged about the rotor 68 without, in any way, affecting the principle involved. Brush 70 contacts with a multiplicity of closely-spaced commutator segments 71, consecutive commutator segments being connected respectively with conducting rings 72, 73, 74. Said segments are insulated as indicated at 75. The current to be controlled by this commutator construction enters through wire a, transversely resistance coil 76, thence through conductor 77, screw 78 and spring 79, to rotor 68, spring 69 and brush 70. From brush 70, it flows through contacting commutator segments, successively, to rings 72, 73, 74. These rings are connected to energize motor 80, driving worm 81, meshing with segmental gear 82 on the horizontal pivot 39.

The motor 80 is preferably a step by step motor having a multiplicity of field poles which are successively energized to rotate the armature by step by step motion.

This motor 80, the commutator which operates it, and the multiplying gear between the brush and the inclinometer pivot 9 need not be more fully described herein since these parts are all described in my above-mentioned application filed January 13, 1920, and all of them except the multiplying gear are shown in said application. The multiplying gear and the commutator are shown and fully described in my above application filed February 3, 1920.

The commutator 109 for the pivotal axis 8, 9, is mounted on studs 2ª, 3ª, on the standard of the binnacle. The corresponding commutator 110 controlled by the pivot 10 is, of course, mounted on the ring 7, as indicated in Fig. 1. The construction of commutator 110, being identical with that just described for 109, the interior of this commutator casing is not shown. It operates a motor 90 on ring 37, identical with motor 80. Motor 90 drives screw gear 91, meshing with segmental gear 92, keyed on pivot 40. 135 is a similar commutator for repeating the directional indication of the compass to remote repeater compasses driven by motors similar to 80 and 90, but not shown as a part of this specification.

As explained in my said prior application, the brush 70, preferably has an arc of contact sufficient to successively rest on one contact only, then on two adjacent contacts, and so on alternately, and the poles of the motor field are connected so that this operates to energize first one field pole piece, then two adjacent pole pieces, then one pole piece, and so on successively; thus the armature has two steps for each pole piece and a number of steps equal to twice the number of the commutator segments.

Since the arc of angular movement of the brush 70 is exactly proportional to, but say four times as great as, the angular movement of the pivotal shaft 9, and as the segments 71 are set as closely as practicable, it will be evident that the angular movements of the shafts 39 and 40 of the compass support will follow with greatest accuracy the angular movements of shafts 9 and 10 of the inclinometer. It will be evident that by reason of the screw gear connection, the compass support is locked against backward transmission of resultant or reacted forces. Moreover, the motors being step by step motors and each step representing a very small angle, the reproduction of angular movements of the inclinometer support in the compass supports will be very faithful, and the motor will be at all times electrically locked. Current for operating the repeating system is shown as from the battery B'. Any suitable current supply may, of course, be utilized and all electrical operations may be energized from a single source of power instead of a multiplicity of batteries as shown.

The compass may be any desired form of non-ballistic compass but preferably it is a gyro-compass and preferably it orients to north through the application of alternating spring torques about the horizontal axis of its mounting, as described in my said patent.

As disclosed herein, the stabilized ring 31 corresponds to the frame 1 of my said prior patent. This ring forms a support for vertical pivots of ring 114, Fig. 1. In my present case, ring 114 has, integral therewith and at right angles to it another ring 115, Fig. 3, which corresponds to the ring 15 of my said patent. This ring 115 carries the horizontal pivots affording the pivotal axis X for the gyro casing. The assembly of parts on the horizontal pivot is shown in detail in Fig. 4 and the means for applying the alternating torques thereto is shown in Fig. 1.

As shown herein the alternating motion is applied through a ring 94 mounted so as to rock upon said pivot X. Rocking of this ring 94 is accomplished by means of electromagnets 95, 95$^a$, and 96, 96$^a$, acting on armatures 97, 97$^a$, carried by said ring 94. Electro-magnet 95 is connected in series with 95$^a$, and 96 in series with 96$^a$. Circuit is made and broken alternately in these pairs of electro-magnets by commutator 98, rotating continuously for desired periods and making and breaking the circuit at a desired rate. There is a common return from 95$^a$, 96$^a$, back to the other pole of the battery B.

The ring 94 is rigidly secured to clutch member 123 (see Fig. 4). The other clutch member 100 is rotatably mounted on ball bearings 120, on the horizontal shaft X, which forms the horizontal pivotal axis for the gyro casing. The clutch member 100 has a movable armature ring 121 supported on springs 122 in close proximity to the co-operating magnet member 123. The normal clearance need be only .01 to .02 inch. Member 123 is an annular magnet energized by coils 124 and to prevent sticking, a friction ring 125 of non-magnetic material projects beyond the face of magnet 123 very slightly, say .01 to .02 in.

Clutch member 123 is mounted on roller bearings 126, supported on a sleeve 127 which is rigid with the vertical support ring 115, Fig. 3. The weight of the gyro casing, pivot X and clutch member 100, is carried by the ball bearings 128. The clutch members 123 and 100 are prevented from longitudinal movement by the fixed roller bearings 120, 126, respectively, and the clutching and unclutching is effected merely by turning current through the coils 124 to energize the electro-magnet and attract the armature ring 121. The clutching movement of the latter is permitted by the spring mounting and the springs are wide and stiff enough edgewise so as to transmit rotary stresses rigidly, but easily yielding in the other direction through the very small distance necessary for the clutching movement. The clutch being energized the rocking movement applied to the magnet member 123 by ring 94 is applied to the outer end of spiral spring 130 which is anchored to the armature member 100 by screw 131; the other end of said spring is anchored to bushing 132 which is secured to shaft X by screw 133.

While the rates of the make and break and the resulting reversals of pull on armatures 97, 97$^a$, may be rapid enough to make the rocking of ring 94 a continuous reciprocation of uniformity sufficient to make the alternating stresses on the spring approximately uniform and symmetrical, it is highly desirable to employ adjustable stops to accurately predetermine and limit the movements, and I have shown set screws 99, 99, which I employ for the purpose.

While it is quite possible to arrange means for applying alternating torques about the vertical axis of the gyro mounting as described in my said patent, the present apparatus is not so equipped. Consequently the present gyro is adapted to orient to north but does not orient to parallelism with the earth's axis and hence does not indicate latitude. Preferably, however, it is set by hand somewhere near the known latitude of which the ship happens to be. Such setting need not be at all accurate.

While the above described springs for suspending the ring 32 are not new as applied to gyro-compasses, they have a new function in my present combination because they permit the mass of gyro mounting to become effective in equalizing the step by step movements of the armatures of motors 80 and 90. That is to say, the reaction of each of the intermittent motor movements is taken up by the mass and the spring suspension. The compass level remains approximately stationary as to horizontals and verticals and such motion as results from the reaction will be reciprocal for a given time, notwithstanding the fact that the roll and pitch of the ship is seldom, if ever, entirely reciprocal.

As before indicated, the commutator and the repeater circuits and motors are the subject of my prior applications above referred to and hence detailed description other than above given is unnecessary in this case. For any further description of the construction and operation of these elements, reference is made to said prior applications.

It will be understood from the above that in its broadest aspects my invention includes any kind of gyro direction indicator, preferably balanced so as to be non-ballistic, and used in combination with any kind of a stabilized base, particularly a gyro-stabilized base. Such combination is disclosed in my said application filed January 13, 1920, and so far as concerns this broad subject matter my present application may be considered as a continuation of said prior application. In said prior application, the stabilizing of the base is effected by direct dynamic reaction of gyroscopic apparatus and my present claim is intended to include such, as well as any other means for effectively stabilizing a base on a ship or other unsteady platform.

While the preferred embodiment of the invention includes my own inclinometer and my own motor repeater circuits, as disclosed herein, my present claim is intended to cover other inclinometers and other forms of motor repeaters.

A spring 134 is secured to the ring 115 at one end, and at the other end to the clutch member 123. It extends perpendicularly, parallel with said ring 115 and at right angles to the operating ring 94 and is for the purpose of returning said ring 94 to exact midway position between electro-magnet poles, whenever the clutch 123 is de-energized. This makes certain that whenever the clutch is re-energized the excursions of ring 94 will be exactly equal distances each way from the medial position, the alternating torques of the spring will necessarily be primarily equal and will remain so except and until rendered asymmetric through torque applied by the rotation of the earth whenever the gyro is out of the north and south meridian plane.

A stabilized base controlled by an inclinometer and intermediate motor circuits, as described herein, may be usefully employed as a support for bomb sights on aeroplanes, and for many other purposes which will be obvious to those skilled in the art.

Housing 136 is merely a cover for the various collector rings, trolleys or brushes utilized for conducting electric current to or from parts carried by or upon ring 114—115.

I claim:

An inclinometer comprising a primary and secondary gyro and a universal joint connecting them, the primary gyro being mounted in gimbals universally balanced in neutral equilibrium; and the secondary gyro being supported by and depending from the primary gyro and said universal joint having its center substantially coincident with the center of motion of the gimbal mounting, in combination with means for repeating at a distance the relative angular movements of the gimbal pivots of the primary gyro.

Signed at New York in the county of New York and State of New York this 13th day of October, A. D. 1921.

CLIFFORD M. PAXTON.